United States Patent [19]

Matsui et al.

[11] 4,031,990
[45] June 28, 1977

[54] SET OF CURRENT COLLECTING ELEMENTS USED FOR A CURRENT COLLECTING ROLLER

[75] Inventors: Kazumi Matsui, Tokyo; Takashi Umemori, Musashino; Yutaka Shibata, Takaishi; Kinzo Yamamura, Fujiidera; Tamisuke Kimura, Kobe; Tomokazu Kashiwara, Nishinomiya, all of Japan

[73] Assignees: Japanese National Railways, Tokyo; Sumitomo Electric Industries, Ltd., Osaka; Sumitomo Rubber Industry, Ltd., Kobe, all of Japan

[22] Filed: Nov. 14, 1975

[21] Appl. No.: 632,164

[30] Foreign Application Priority Data

Nov. 26, 1974 Japan .............................. 49-136472

[52] U.S. Cl. .................................. 191/63; 191/1 R
[51] Int. Cl.[2] .......................................... B60L 5/04
[58] Field of Search ............ 191/1 R, 61, 63, 45 R, 191/59; 295/1; 152/362 R, 393

[56] References Cited

UNITED STATES PATENTS

| 1,859,343 | 5/1932 | Rouge | 191/1 R |
| 2,686,891 | 8/1954 | Burgin | 191/1 R |

*Primary Examiner*—Trygve M. Blix
*Assistant Examiner*—Reinhard J. Eisenzopf
*Attorney, Agent, or Firm*—Wenderoth, Lind & Ponack

[57] ABSTRACT

There is disclosed a set of current collecting elements used for a current collecting roller which feeds current to a transportation apparatus. The set of current collecting elements comprises a plurality of electroconductive elements arranged in juxtaposed relation to one another, said electroconductive elements being tightly and rigidly secured to each other by a lead wire at the lower portion of said elements.

The current collecting roller using the present sets of current collecting elements is protected from being damaged by heat being generated between current collecting member and each of the electroconductive elements.

9 Claims, 15 Drawing Figures

A-A

B-B

Fig.5(a) Fig.5(b) Fig.5(c)
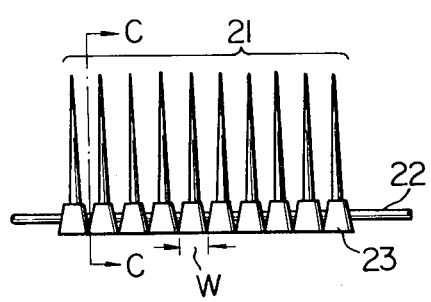 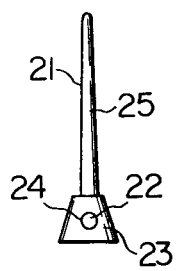 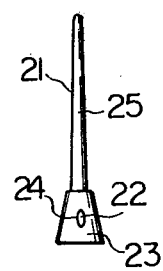
Fig.6(a) Fig.6(b) Fig.6(c)
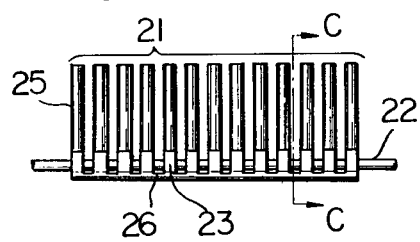 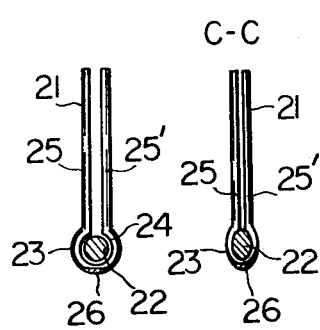
Fig.7
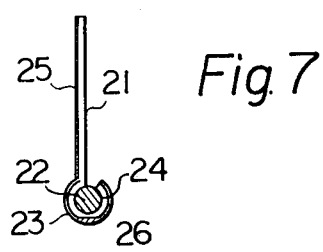

SET OF CURRENT COLLECTING ELEMENTS USED FOR A CURRENT COLLECTING ROLLER

BACKGROUND OF THE INVENTION

1. Field of the Invention

This invention relates to a set of current collecting elements used for a current collecting roller in a transportation apparatus which receives current from a current collecting line, a current feeder, or a currentfeeding rail, and more particularly to a current collecting roller adapted to rotate in contact with the currentfeeding rail, to thereby collect current.

2. Prior Art

Two types of current collecting roller have previously been proposed by the inventors. One type was patented as U.S. Pat. No. 3,871,727 (issued on March 1975), which discloses a resilient current collecting roller composed, as a main body, of a solid rubber wheel (refer to FIG. 1) in which a current collecting member is embedded. The other type of roller was filed as U.S. Pat. Application Ser. No. 594073 (filed on July 8, 1975, one of priority dates thereof is the same as that of the present application), which describes a resilient current-collecting roller which is composed, as a main body, of a hollow rubber wheel (refer to FIG. 2) in which a current collecting member is embedded.

The current collecting member in the prior art consists of a number of metallic electroconductive elements 3 embedded in juxtaposed relation in the peripheral surface of the solid or hollow rubber wheel 1, and said electroconductive member electrically connecting the current collecting member 4 to an electroconductive rigid wheel 2, which carries the rubber wheel 1 and serves as a current lead out portion for transmitting driving current, which has been collected by the current collecting roller from a current feeding rail, to a transportation apparatus (not shown). If the electrical connection between the current collecting member and the electroconductive member should be defective, heat is generated between both members, leading to a separation of one member from the other and resulting in damage to that portion.

SUMMARY OF THE INVENTION

The present invention is directed to ensuring the electroconductivity and electrical connection between the current collecting member and the electroconductive member of the rubber-make current collecting roller of the type described. The above described object of the present invention is attained by piercing a lead wire which is an electroconductive member through slits or through-holes provided in the lower portions of respective electroconductive elements which constitute the current collecting member, and squeezing the lower portion having slits or through-holes, so as to rigidly respective current collecting elements to the electroconductive member, thus both members are integrally joined.

This and other objects and features of the present invention will be apparent from the ensuing part of the specification in conjunction with drawings which indicate preferred embodiments of the invention.

BRIEF DESCRIPTION OF THE DRAWINGS

FIGS. 3(a), 4(a), 5(a) and 6(a) are front views of sets of current collecting elements of a composite current collecting member, respectively;

FIGS 3(b), 4(b), 5(b) and 6(b) are side views of a current collecting element, respectively;

FIGS 3(c), 4(c), 5(c) and 6(c), respectively, are side views of current collecting elements made of an electroconductive metal strip, wherein the lower end of the respective current collecting element with a gap or slit is crushed to be rigidly secured to a lead wire; and, FIG. 7 is a side view of another modified form of the current collecting element.

DETAILED DESCRIPTION OF THE INVENTION

Figure 1:
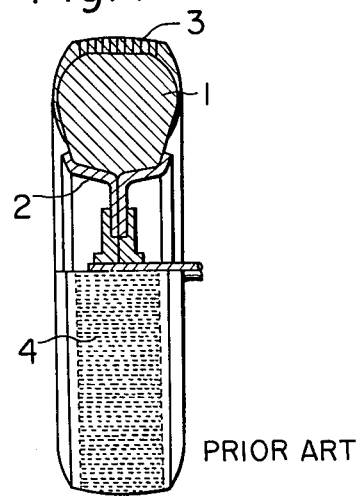
FIG. 1 is a front view, partly shown in cross section, of a typical rubber-made current collecting roller which is composed, as a main body, of a solid rubber wheel.
Figure 2:
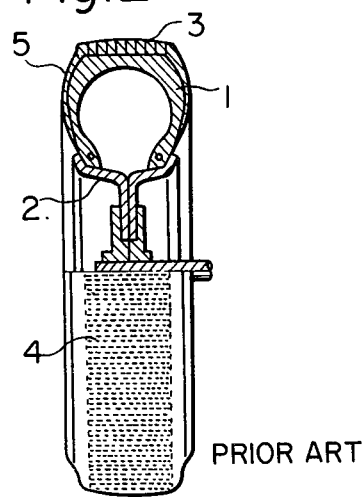
FIG. 2 is a front view, partly shown in cross section of another typical rubber-made current collecting roller which is composed, as a main body, of a hollow rubber wheel.

The set of current collecting elements, which is used for constituting metallic electroconductive elements relating to the present invention, can be used with the typical current collecting rollers which are composed, as a main body, of a solid rubber wheel (see FIG. 1) or a hollow rubber wheel (see FIG. 2).

Figure 3A:
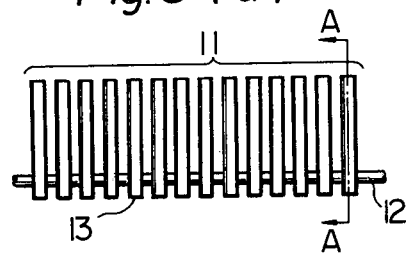
Figures 3B, 3C:
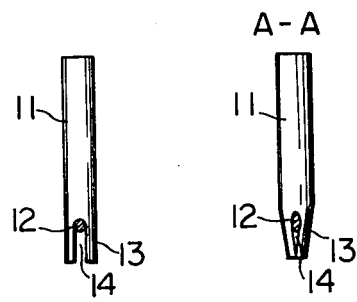

FIG. 3(a) shows a set of current collecting elements which constitutes a composite current collecting member. This set of current collecting elements consists of a number of electroconductive metal strips 11 arranged in juxtaposed relation to one another with a lead wire 12 piercing through the lower portion thereof. Each metal strip 11 is provided with a slit 14 in the lower portion 13, as seen in FIG. 3(b). The length of lead wire 12, which is made of an electroconductive material, is inserted in the slits 14 of the metal pieces 11, and then external force is applied to the lower portion of each metal piece to close the slit, whereby each electroconductive metal piece 11 is rigidly secured to the lead wire 12. This fixing means may be replaced by welding or the like.

The lead wire 12 should be long enough to go from one fitting portion of an electroconductive rigid member via the outer circumferential portion thereof to the other fitting portion thereof, or otherwise long enough to go from the circumferential portion of the rigid member to one fitting portion.

Figure 4A:
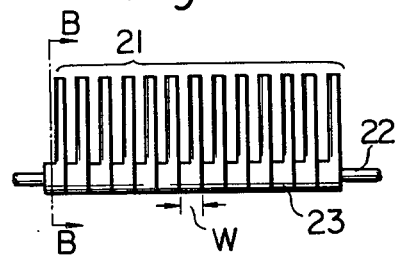
Figures 4B, 4C:
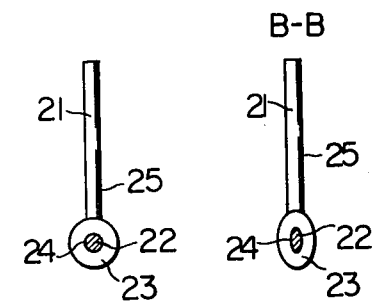

FIG. 4 shows a further modified form of a set of current collecting elements. This embodiment is the same as the embodiment of FIG. 3 in that the set of current collecting elements consists of electroconductive metal pieces 21 arranged in side by side relation to one another. The set of current collecting elements 21 has a cylindrical, bulged lower portion 23 provided with a through-hole 24 which runs across an upright stem or rod portion 25 of each element 21. The cylindrical bulged lower portion 23 has a width, as viewed in the side view, larger than a diameter or a thickness of the upright rod portion 25. With the aid of the cylindrical, bulged portion, respective electroconductive metal pieces 21 are arranged in side by side relation at equal spaces from one another.

A continuous lead wire 22 of an appropriate length is inserted in the through-holes 24 provided in the cylindrical, bulged lower portions of respective metal pieces, and then the cylindrical, bulged lower portions 23 are pressed under strong pressure from the outside, so that the through-holes are closed, whereby respective current collecting elements 21 are rigidly fixed to the length of lead wire 22, which serves as an electroconductive member.

The through-hole 24 may be a slit as in the case of each FIG. 3, and the fixing of respective element to the lead wire may be effected by welding or means equivalent thereto, in place of the pressure-closing.

The cylindrical, bulged lower portion of each respective current collecting element may be of a truncated conical shape, as shown in FIGS. 5a–5c. In this case, the truncated conical lower portion is provided with a through-hole 24 which runs in across the upright stem or rod portion 25. The continuous lead wire 22 is inserted in the through-holes of the respective elements and then the lower portions are pressed under strong force to close the through-holes, whereby the respective current collecting elements 21 are rigidly secured to the lead wire 22.

The truncated conical lower portion 23 of each element contributes to arranging respective electroconductive metal pieces 21 in a side by side equally spaced relation.

A still further modification of the set of current collecting elements is illustrated in FIGS. 6a–6c. Each set of current collecting elements 21 is an assembly of a number of hairpin-shaped electroconductive metal pieces which are obtained from a single pierce of elongated metal, or a composite comb-shaped electroconductive metal plate of a U-shape in cross section which is obtained from a metal plate, as seen in FIG. 6(b). Each set of current collecting elements 21 has a number of pairs of prongs 25 and 25' and circular lower portions 23, as viewed in cross section. When the set of current collecting elements 21 is composed of a number of hairpin-shaped electroconductive metal pieces, it is preferable that the lower portions 23 of the respective metal pieces 21 be coupled to each other by means of elongated metal pieces 26 inserted therebetween, as seen in FIG. 6(a), so that the number of hairpin-shaped metal pieces are stably arranged in equi-spaced relation to one another on the outer circumferential portion of the rubber, hollow wheel.

The continuous lead wire 22 of an appropriate length is inserted in the holes 24 in the circular lower portions 23 of respective metal pieces, and the circular lower portions are strongly pressed from the outside, whereby the set of current collecting elements 21 is rigidly secured to the lead wire 22.

The set of current collecting elements 21 may also be of a hook shape in cross section which has only a single prong 25, as shown in FIG. 7.

In the embodiments shown in FIGS. 3 and 7, the lead wire or electroconductive member is inserted in the slits or through-holes provided in the lower portions of the respective metal pieces constituting the set of current collecting elements, and the lead wire and the set of current collecting elements are rigidly secured to each other by closing the slits or through-holes or by welding or the like, so that if the rubbery, hollow wheel is subjected to deformation due to the load exerted thereon when the rubber-made, current collecting roller is pressed against the current-feeding rail, there is no risk of a defective connection between the current collecting member and the electroconductive member. There is the assurance of providing the excellent conductivity therebetween, and hence the current collecting roller is protected from being damaged by heat being generated between the current collecting member and the electroconductive member.

The current collecting roller using the current collecting member composed from a plurality of the sets of current collecting elements of the present invention may be used as an auxiliary roller or driving wheel for a motor vehicle which travels on the road, or may be employed for discharging to the road static electricity accumulated in a motor vehicle.

What is claimed is:

1. A current collecting apparatus for use in a current collecting member operatively connected to a current collecting roller, said current collecting apparatus comprising:
   a plurality of juxtaposed electroconductive elements having truncated lower portions with at least one hole therethrough; and
   a lead wire fitted through and secured to said holes in said plurality of electroconductive elements.

2. An apparatus as claimed in claim 1, wherein said hole is tightly squeezed around and secured to said wire.

3. An apparatus as claimed in claim 2, wherein said wire is welded into said hole.

4. A current collecting apparatus for use in a current collecting member operatively connected to a current collecting roller, said current collecting apparatus comprising:
   a plurality of electroconductive elements of hairpin-shaped electroconductive metal positioned adjacent each other, each of said elements having an enlarged open portion at the bottom portion thereof;
   a coupling piece attached across the bottom of said plurality of electroconductive elements; and
   a lead wire fitted through and secured to said bottom open portion in said electroconductive elements.

5. An apparatus as claimed in claim 4, wherein said open portion is tightly squeezed around and secured to said wire.

6. An apparatus as claimed in claim 4, wherein said wire is welded into said open portion.

7. A current collecting apparatus for use in a current collecting member operatively connected to a current collecting roller, said current collecting apparatus comprising:
   a comb-shaped electroconductive plate of U-shaped cross-section having a plurality of electroconductive tooth portions, and having at least one opening through the lower portion thereof; and
   a lead wire fitted through and secured to said opening in said electroconductive metal plate.

8. An apparatus as claimed in claim 7, wherein said opening is tightly squeezed around and secured to said wire.

9. An apparatus as claimed in claim 8, wherein said wire is welded into said opening.

* * * * *